No. 661,721. Patented Nov. 13, 1900.
E. C. JENKINS.
CHANGEABLE RUNNING GEAR FOR VEHICLES.
(Application filed June 9, 1900.)
(No Model.) 3 Sheets—Sheet 1.

Witnesses.
W. J. Baldwin
M. E. Regan.

Inventor.
E. C. Jenkins,
By
Southgate & Southgate
Attorneys.

No. 661,721. Patented Nov. 13, 1900.
E. C. JENKINS.
CHANGEABLE RUNNING GEAR FOR VEHICLES.
(Application filed June 9, 1900.)

(No Model.) 3 Sheets—Sheet 2.

Witnesses.
W. J. Baldwin
M. E. Hegan.

Inventor.
E. C. Jenkins,
By
Southgate & Southgate
Attorneys.

No. 661,721. Patented Nov. 13, 1900.
E. C. JENKINS.
CHANGEABLE RUNNING GEAR FOR VEHICLES.
(Application filed June 9, 1900.)

(No Model.) 3 Sheets—Sheet 3.

Witnesses:
W. J. Baldwin
M. E. Regan

Inventor:
E. C. Jenkins
By Southgate & Southgate
Attorneys.

UNITED STATES PATENT OFFICE.

EBENEZER C. JENKINS, OF SHREWSBURY, MASSACHUSETTS.

CHANGEABLE RUNNING-GEAR FOR VEHICLES.

SPECIFICATION forming part of Letters Patent No. 661,721, dated November 13, 1900.

Application filed June 9, 1900. Serial No. 19,688. (No model.)

*To all whom it may concern:*

Be it known that I, EBENEZER C. JENKINS, a citizen of the United States, residing at Shrewsbury, in the county of Worcester and State of Massachusetts, have invented a new and useful Changeable Running-Gear for Vehicles, of which the following is a specification.

This invention relates to an improved running-gear for vehicles; and the object of this invention is to provide a road-vehicle having two sets of wheels, either one of which may be brought into operation as desired—that is to say, in addition to its ordinary running-wheels a vehicle constructed according to this invention is provided with a supplemental set of wheels preferably designed to run on tracks.

To this end this invention consists of the vehicle and of the combinations of parts therein, as hereinafter described, and more particularly pointed out in the claims at the end of this specification.

Figure 1:
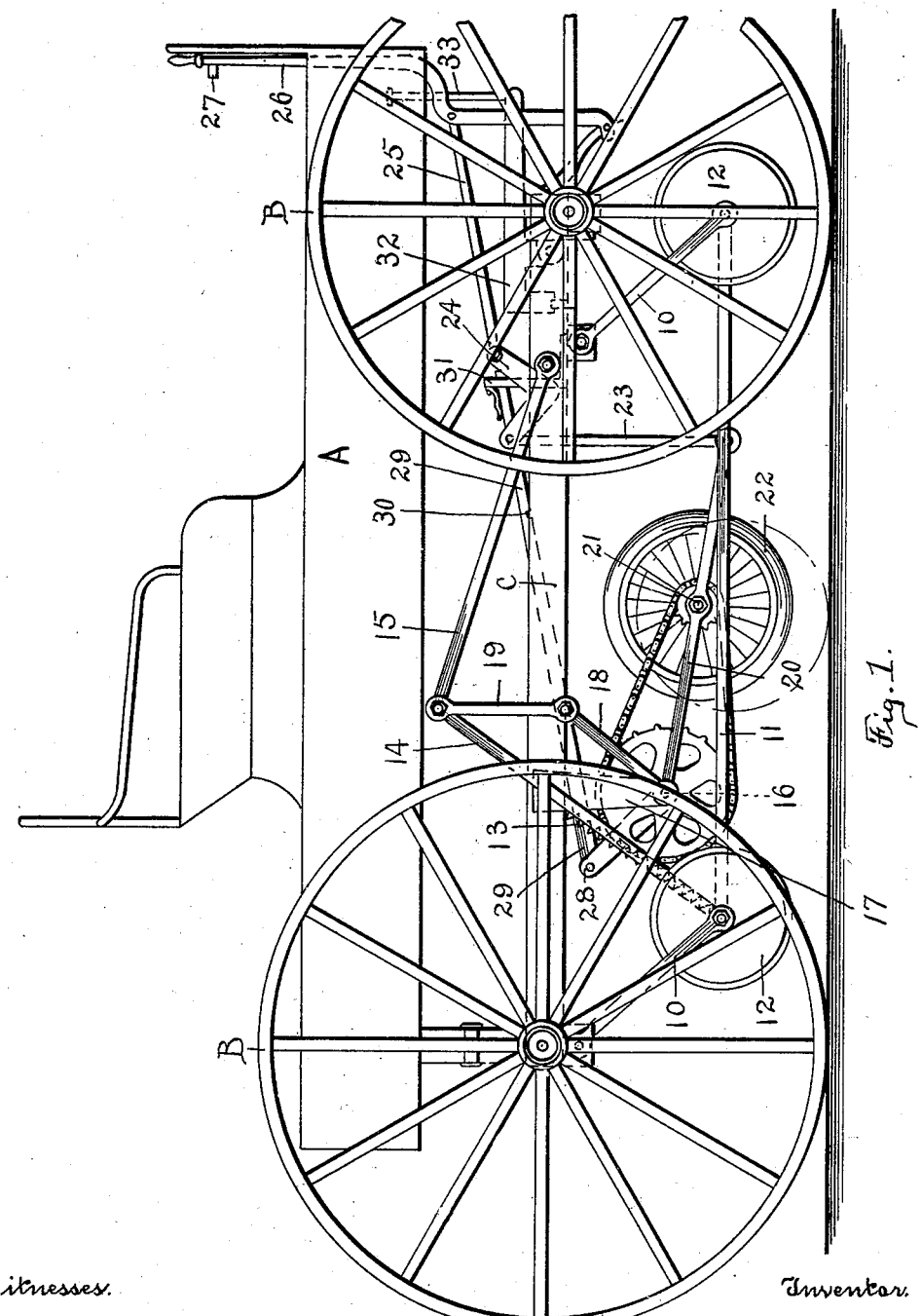
Figure 2:
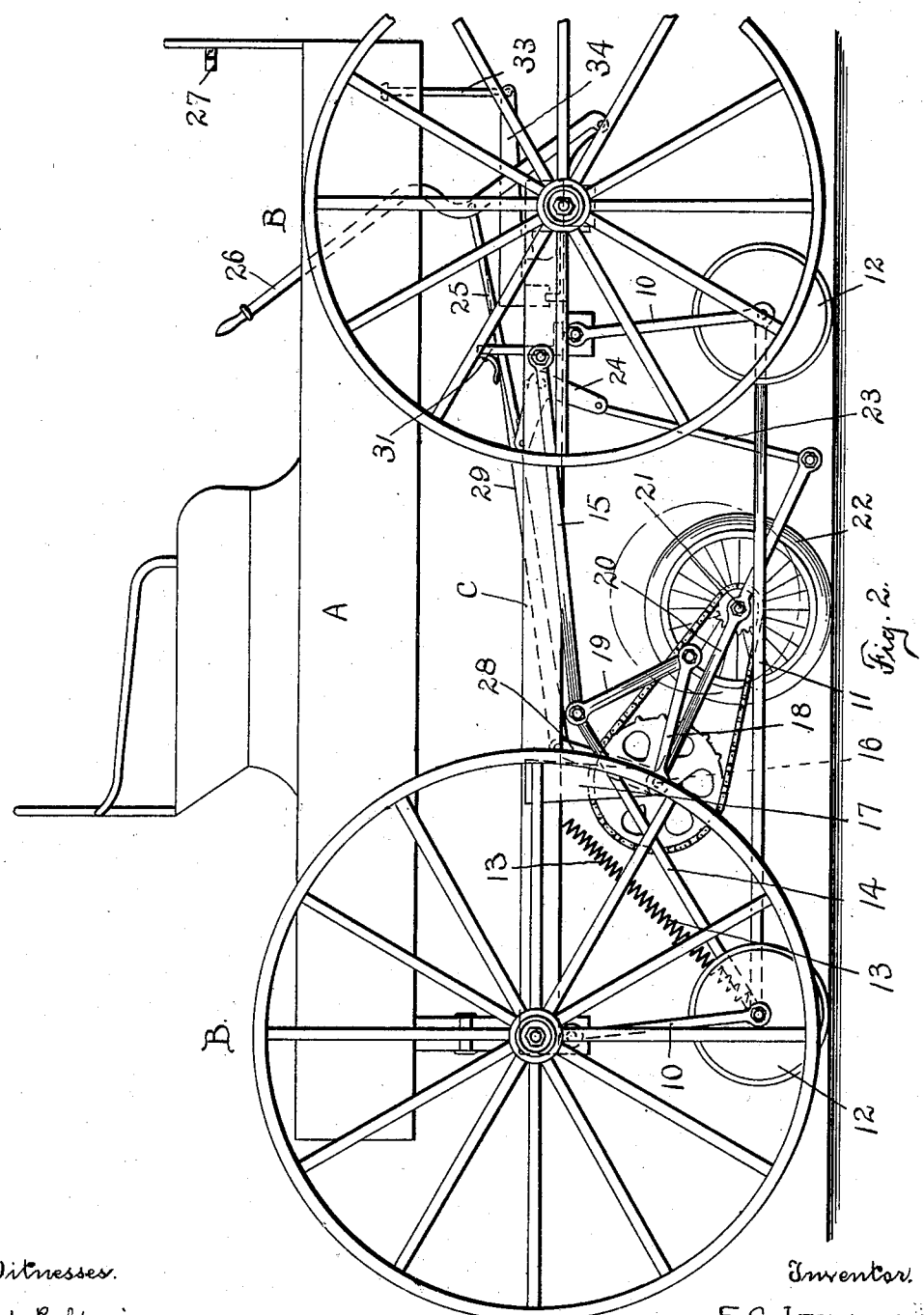
Figure 3:
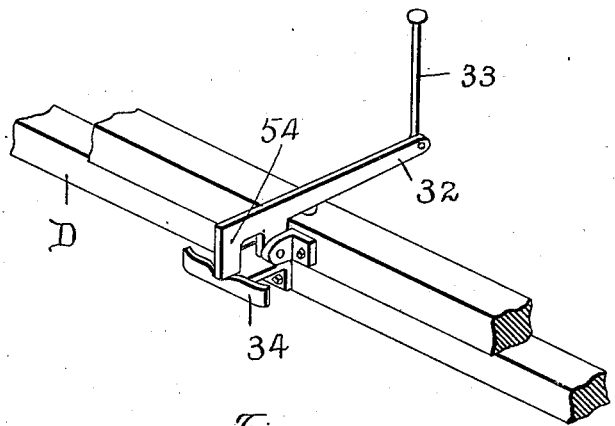
Figure 4:
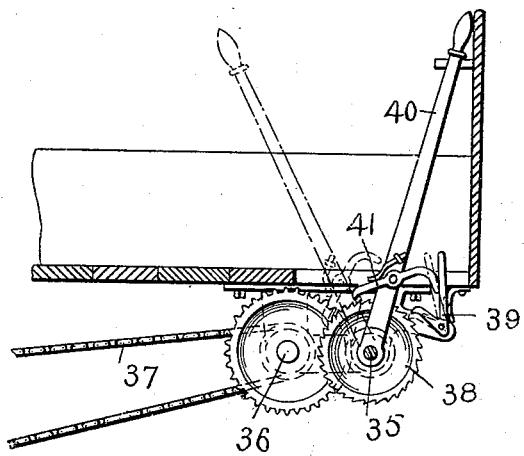
Figure 5:
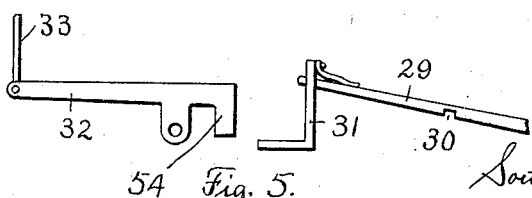

In the accompanying three sheets of drawings, Figure 1 is a side view of a vehicle constructed according to this invention, the parts being in their normal or usual position. Fig. 2 is a similar view showing the vehicle supported so as to run on the track-wheels. Fig. 3 is a detail perspective view of the connections for releasing the track-wheels when the front axle is cramped or turned. Fig. 4 is a detail view illustrating a modified form of mechanism for bringing the track-wheels into operation, and Fig. 5 is a detail view of the locking connections for holding the track-wheels in operative position.

The increasing number of tracks which are now being laid along many highways has heretofore been a constant source of danger and annoyance to the drivers of road-vehicles. This is due not only to the fact that wheeled vehicles are seldom built of the proper gage to run upon street-car tracks, but is also due to the fact that having once been driven onto the tracks of a street-railroad it is difficult to turn a vehicle out of engagement with the same without wrenching or straining the vehicle-wheels.

The especial object of this invention is therefore to provide a vehicle with a supplemental set of wheels of the proper gage to run on ordinary street-car track-rails; and a further object of this invention is to arrange the two sets of wheels of a vehicle constructed according to this invention so that the vehicle may be readily driven onto or off of the street-car tracks, as may be desired.

To these ends a vehicle constructed according to this invention is provided with two sets of wheels arranged so that the vehicle may run upon and be supported by either set of wheels as desired. One set of wheels may be the ordinary road-wheels which are used to run upon the surface of an ordinary highway, and the other set of wheels is preferably of a construction to engage and run upon the tracks of street-railroads. In the preferred construction the track-wheels are normally in a lifted or raised position, and connections are employed for lowering or moving down the track-wheels whenever it is desired to have the vehicle run upon tracks. The track-wheels may be locked in their lowered or operative position by a suitable locking mechanism, and releasing devices are preferably provided which may be released by the pressure of the foot of the driver or which may be automatically released whenever the front axle is cramped or turned at an angle.

In the construction herein illustrated the track-wheels are mounted in a frame which is movably supported by parallel links. The supporting-links, which extend down to the frame of the track-wheels, normally stand in an inclined position. Toggle connections are arranged to force or move down the track-wheels to bring the same into operative position. These toggle connections are arranged to be operated when desired by the motive power of the vehicle itself, or, if preferred, hand-operated connections may be employed for bringing the track-wheels into operation.

Referring to the drawings and in detail the vehicle herein illustrated comprises a vehicle-body A, which normally runs upon the ordinary road-wheels B.

The rear axle of the vehicle herein illustrated is connected to the circle or pivotal connection with the front axle by reaches or side-bars C. These parts may be of the ordinary or approved construction.

Connected to the side-bars or other convenient parts of the vehicle are downwardly-extending parallel links 10, which carry a frame 11. Secured on axles journaled in the frame 11 or otherwise supported therein are track-wheels 12. The track-wheels 12 are preferably flanged in a similar manner to ordinary car-wheels, so as to run upon and be retained on street-railroad tracks. The frame 11 and its track-wheels 12 are normally held in a raised or inoperative position by a spring 13. (Most clearly illustrated in Fig. 2.) To lower the track-wheels or bring the same into operation, I preferably employ a set of toggle-levers 14 and 15 at each side of the vehicle. To operate the toggle-levers 14 and 15, I preferably employ a shaft 16, journaled in brackets 17, extending down from the side-bars C, which shaft 16 is provided with arms 18, connected to the toggle-levers by links 19. By means of this construction when the shaft 16 is turned or oscillated the toggle-levers 14 and 15 will be straightened or brought more nearly into line with each other to carry the track-wheels down into operation, as illustrated in Fig. 2. The shaft 16 may be turned to accomplish this purpose by any desired form of connection. In practice, however, I prefer to employ connections for turning the shaft 16 from the forward motion of the vehicle itself.

As herein illustrated, a central frame 20 is journaled on the shaft 16, and mounted in the frame 20 is a shaft 21, having a wheel 22 secured thereon. The wheel 22 is preferably provided with an elastic or cushion tire to prevent the same from slipping on the surface of the road and is connected to turn the shaft 16 by means of suitable sprocket-wheels and a chain, as shown. At its front end the frame 20 is connected to a bell-crank lever 24 by means of a link 23 and the bell-crank lever 24 is connected to a hand-lever 26 by means of a link 25. The hand-lever 26 is normally held in its forward or normal position by a catch, as 27, so as to hold the wheel 22 normally up out of engagement with the surface of the road. When it is desired, however, to operate the wheel 22 to bring the track-wheels of the vehicle into operation, the hand-lever 26 may be drawn back to depress the wheel 22, as shown by dotted lines in Fig. 1, so that through the connections described the frame carrying the track-wheels will be moved down to operative position, as illustrated in Fig. 2. When the track-wheels are in their operative or lowered position, as illustrated in Fig. 2, the links 10 preferably stand at a comparatively slight inclination to the vertical, so that the weight of the vehicle will have a comparatively slight tendency to throw the track-wheels out of operation.

Any desired form of locking mechanism may be employed for holding the track-wheels in their lowered or operative position. As herein illustrated the shaft 16 is provided with a crank-arm 28, which is connected at its upper end to a slide or rod 29. The slide or rod 29 is provided with a notch or recess 30 for engaging a catch or detent 31, so that when the track-wheels are brought to operative position the slide or rod 29 will be locked to hold the same in place. To release the locking connections, so as to allow the track-wheels to be again lifted up out of the way to permit the vehicle to run on its ordinary road-wheels, I provide a releasing-lever 32, which is pivoted in position to lift the slide or rod 29, so as to release the notch 30 from the detent 31. The releasing-lever 32 may be controlled from a footpiece or plunger 33. By means of this construction the track-wheels may be brought into operation whenever desired and may be released or allowed to assume their normal inoperative position by simply depressing or operating the footpiece or plunger 33. In addition to these releasing connections it may be desirable to provide a construction by means of which the track-wheels will be released and lifted up out of the way whenever the front axle is cramped or turned at an angle. To accomplish this result, the front axle D, as most clearly illustrated in Fig. 3, may be provided with an operating-piece or double cam 34, engaging a projection 54, extending down from the lever 32, so that by means of this construction whenever the front axle D is cramped or turned sharply at an angle the track-wheels will be released and the vehicle allowed to rest upon and run upon its ordinary road-wheels without the necessity of special attention or releasing operation by the driver.

In some cases instead of providing connections operated from the forward motion of the vehicle for lowering the track-wheels to operative position I contemplate employing a hand-operating mechanism for accomplishing this purpose, and I have illustrated such a construction in Fig. 4. As shown in this figure, a shaft 35 is geared to turn a shaft 36, which shaft 36 may be connected to turn the shaft 16, as heretofore described, through a sprocket-chain 37. Secured on the shaft 35 is a ratchet-wheel 38. Arranged to engage the ratchet-wheel 38 is a holding-pawl 39, and pivoted on the shaft 35 is an operating-lever 40, carrying an operating-pawl 41. The pawls 39 and 41 are provided with engaging tailpieces, so that when the lever 40 is in its normal or thrown-back position, as illustrated in Fig. 4, the pawls 39 and 41 will both be thrown out of engagement with the ratchet-wheel 38. When the lever 40 is drawn back from its normal position, as indicated by dotted lines, the pawls 39 and 41 will engage with the ratchet-wheel 38, so that by reciprocating the lever 40 the track-wheels may be brought down into operative position, as heretofore described, and as the pawls of this hand-operated connection are normally out of engagement with the ratchet-wheel 38 they will not interfere with the release or movement required to restore said track-wheels to their normal or lifted position. In the use of a vehicle as thus constructed the vehicle may be readily used either upon a plain highway or upon railroad-track rails, as desired, and the liability of wrenching or breaking the road-wheels when attempting to turn out of the car-tracks will be completely avoided.

I am aware that numerous changes may be made in applying my invention to road-vehicles by those who are skilled in the art without departing from the scope of my invention as expressed in the claims. For example, my invention is equally applicable to various forms of motor-carriages as well as to different kinds of wagons and driving-vehicles. I do not wish, therefore, to be limited to the construction which I have herein shown and described; but What I do claim, and desire to secure by Letters Patent of the United States, is—

1. The combination of a vehicle having road-wheels, a frame carrying track-wheels, parallel links normally supporting said frame in a raised position, and means for depressing the frame when it is desired to have the vehicle run on the track-wheels, substantially as described.

2. The combination of a vehicle having road-wheels, a set of normally-lifted track-wheels, and a toggle mechanism for lowering the track-wheels when desired, substantially as described.

3. In a vehicle, the combination of a set of wheels on which said vehicle normally runs, a supplemental set of wheels normally supported in an inoperative position, a set of connections for bringing the supplemental set of wheels into operative position, and a locking device for said connections, substantially as described.

4. The combination of a vehicle having road-wheels, a set of normally-lifted track-wheels, connections for bringing the track-wheels into operative position, a locking mechanism for said connections, and means for releasing the locking mechanism, substantially as described.

5. The combination of a vehicle having road-wheels, a set of normally-lifted track-wheels, connections for lowering the track-wheels when desired, locking connections for holding said track-wheels in operative position, and connections for releasing said track-wheels when the front axle of the vehicle is cramped or turned, substantially as described.

6. The combination of a vehicle having road-wheels, a set of normally-lifted track-wheels, connections for lowering the track-wheels when desired, a locking mechanism for holding the track-wheels in operative position, and a foot-controlled connection for releasing said locking mechanism, substantially as described.

7. The combination of a vehicle having road-wheels, a frame carrying track-wheels, parallel links supporting said frame, a spring normally holding the frame in a raised position, and a locking mechanism for holding the frame in operative position, substantially as described.

8. The combination of a vehicle having road-wheels, a frame carrying track-wheels, parallel links supporting said frame, a spring normally holding the frame in a lifted position, and toggle connections for depressing said frame when it is desired to bring the track-wheels into operative position, substantially as described.

9. The combination of a vehicle having road-wheels, a frame carrying track-wheels, downwardly-extending inclined links supporting said frame, means for depressing the frame to bring the track-wheels into operative position, a locking mechanism for locking the parts in said position, the links being arranged so that they will be but slightly inclined from a vertical position when the vehicle is running on its track-wheels, whereby the weight of the vehicle will cause a comparatively slight strain upon the locking mechanism, substantially as described.

10. The combination of a vehicle having road-wheels, a frame carrying track-wheels, parallel links normally supporting said frame in a raised position, a toggle mechanism for depressing the frame, and connections operated by the motion of said vehicle for actuating said toggle mechanism, substantially as described.

11. The combination of a vehicle having road-wheels, a frame carrying track-wheels, parallel links normally supporting said frame in a raised position, a toggle mechanism for depressing the frame to bring the track-wheels into operation, and a lock for holding the frame in its depressed position, substantially as described.

12. The combination of a vehicle having road-wheels, a frame carrying track-wheels, parallel links normally supporting said frame in a raised position, a toggle mechanism for depressing said frame, a locking mechanism for holding the frame in its depressed position, and foot-controlled connections for releasing said locking mechanism, substantially as described.

13. The combination of a vehicle having road-wheels, a frame carrying track-wheels, parallel links normally supporting said frame in a raised position, a toggle mechanism for depressing the frame, a lock for holding the frame in its depressed position, and a releasing-lever arranged to be operated to release said lock either by a foot-controlled connection or by means controlled by the cramping or turning of the front axle of the vehicle, substantially as described.

14. The combination of a vehicle having road-wheels, a frame carrying track-wheels, parallel links normally supporting said frame in a raised position, a toggle mechanism for depressing the frame, a shaft connected by links to operate said toggle mechanism, and means for turning said shaft, substantially as described.

15. The combination of a vehicle having road-wheels, a frame carrying track-wheels, links normally supporting said frame in a raised position, a toggle mechanism for depressing the frame, a shaft connected by links to operate the toggle mechanism, and means for locking said parts to hold the track-wheels in operative position, substantially as described.

16. The combination of a vehicle having road-wheels, a frame carrying track-wheels, links normally supporting said frame in a raised position, a toggle mechanism for depressing the frame, a shaft connected by links to operate the toggle mechanism, and means for causing the motive power of the vehicle to turn said shaft, substantially as described.

17. The combination of a vehicle having road-wheels, a frame carrying track-wheels, parallel links normally supporting said frame in a raised position, a toggle mechanism for depressing the frame, a shaft connected by links to operate the toggle mechanism, means controlled from the seat of said vehicle for turning said shaft, and a lock consisting of a slide or bar operated by a crank-arm on said shaft, and having a notch engaging a detent for holding the track-wheels in operative position, substantially as described.

18. The combination of a vehicle, two sets of wheels therefor, and means for applying the motive power of the vehicle to bring either set of wheels into operative position as desired, substantially as described.

In testimony whereof I have hereunto set my hand in the presence of two subscribing witnesses.

EBENEZER C. JENKINS.

Witnesses:
 LOUIS W. SOUTHGATE,
 PHILIP W. SOUTHGATE.